(12) United States Patent
Setterberg et al.

(10) Patent No.: US 9,471,765 B1
(45) Date of Patent: Oct. 18, 2016

(54) FINGERPRINT AUTHENTICATION WITH TEMPLATE UPDATING

(71) Applicant: Fingerprint Cards AB, Göteborg (SE)

(72) Inventors: Eric Setterberg, Västra Frölunda (SE); Morten Jensen, Farum (DK); Markus Andersson, Lomma (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/066,219

(22) Filed: Mar. 10, 2016

(30) Foreign Application Priority Data

Jul. 1, 2015 (SE) .................................... 1550931

(51) Int. Cl.
| | |
|---|---|
| G06K 9/62 | (2006.01) |
| G06K 9/54 | (2006.01) |
| G05B 19/00 | (2006.01) |
| G06F 21/32 | (2013.01) |
| G06K 9/00 | (2006.01) |
| G06F 17/30 | (2006.01) |

(52) U.S. Cl.
CPC ........... *G06F 21/32* (2013.01); *G06F 17/3028* (2013.01); *G06F 17/30345* (2013.01); *G06K 9/001* (2013.01); *G06K 9/00093* (2013.01)

(58) Field of Classification Search
CPC ..................... G06K 9/00067; G06K 9/00087; G06K 9/00006; G06K 9/0008; G06K 9/00093; G06K 9/001; G07C 9/00158; G06F 21/32; G06F 17/3028; G06F 17/30345
USPC ....... 382/100, 125, 126, 127, 128, 171, 173, 382/181, 168, 190, 195, 209, 305; 340/5.83, 5.2, 5.8, 5.81, 5.82, 5.52; 713/186
See application file for complete search history.

(56) References Cited

U.S. PATENT DOCUMENTS

| | | | | |
|---|---|---|---|---|
| 7,627,150 B2 * | 12/2009 | Abiko | ................ | G06K 9/00026 345/629 |
| 8,588,484 B2 * | 11/2013 | Wang | ..................... | G06K 9/001 382/115 |
| 8,594,394 B2 * | 11/2013 | Bringer | .............. | G06K 9/00093 358/1.2 |

(Continued)

FOREIGN PATENT DOCUMENTS

| | | |
|---|---|---|
| EP | 1306804 A1 | 5/2003 |
| EP | 2234324 A1 | 9/2010 |

*Primary Examiner* — Sheela C Chawan
(74) *Attorney, Agent, or Firm* — Remarck Law Group PLC

(57) ABSTRACT

A method of authenticating a finger against a stored template and expanding the stored template. The method comprises acquiring a present fingerprint image; retrieving a stored enrollment representation, comprising said stored template, and a representation of at least a first previous fingerprint image acquired in connection with a previous failed authentication attempt; and determining if the stored template should be expanded. When it is determined that a first match between a present fingerprint image representation and the stored template fulfills a first template updating requirement and a second match between the present fingerprint image representation and said at least first previous fingerprint image representation fulfills said second template updating requirement, a signal indicating a successful authentication is provided; and a first expanded template is formed based on said stored template, said present fingerprint image and said at least first previous fingerprint image.

14 Claims, 6 Drawing Sheets

(56) References Cited

U.S. PATENT DOCUMENTS

| | | | | |
|---|---|---|---|---|
| 8,611,618 B2 * | 12/2013 | Kwon | ................ | G06K 9/00087 382/124 |
| 2005/0270140 A1 * | 12/2005 | Oh | ....................... | G06K 9/6255 340/5.83 |
| 2008/0212846 A1 * | 9/2008 | Yamamoto | ............... | G06K 9/68 382/115 |
| 2013/0259330 A1 | 10/2013 | Russo et al. | | |
| 2016/0125223 A1 * | 5/2016 | Boshra | ............... | G06K 9/00013 382/124 |

* cited by examiner

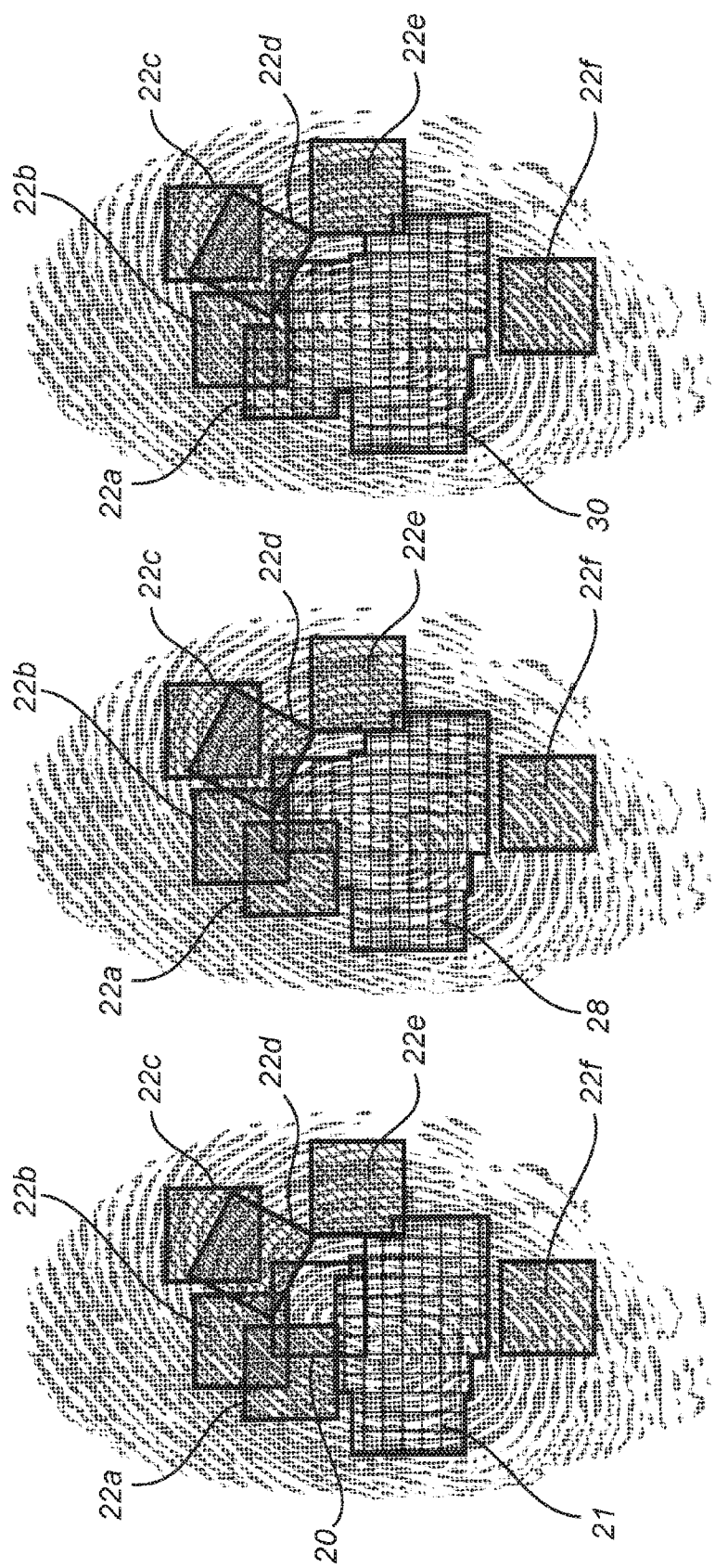

FINGERPRINT AUTHENTICATION WITH TEMPLATE UPDATING

CROSS REFERENCE TO RELATED APPLICATIONS

This application claims the benefit of Swedish Patent Application No. 1550931-8 filed Jul. 1, 2015. The disclosure of the above application is incorporated herein by reference in its entirety.

FIELD OF THE INVENTION

The present invention relates to a method of expanding a stored template in connection with fingerprint authentication, and to a fingerprint authentication system.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance, and user acceptance.

To save cost and valuable surface space, there is an effort towards smaller and smaller fingerprint sensors, which may be substantially smaller than the user's fingerprint.

One way of achieving satisfactory biometric performance with a small fingerprint sensor is to provide a so-called swipe sensor or strip sensor. By instructing the user to swipe his finger across the sensor surface and capturing image slices during the swiping motion sufficient fingerprint information can be collected.

For some applications, however, swiping the finger across the sensor may not be considered to be sufficiently intuitive and simple to the user.

For such and other applications, fingerprint sensing systems employing small sensors for stationary finger placement have been proposed. In such fingerprint sensing systems, the user may be authenticated against a stored template based on a single partial fingerprint image from the sensor.

For achieving the desired satisfactory biometric performance when authenticating based on a single partial fingerprint image from a small fingerprint sensor, it may be necessary that the stored template corresponds to a considerably larger portion of the user's fingerprint than the partial fingerprint image captured in connection with an authentication attempt.

One way of achieving such a larger template is to enroll users on a larger fingerprint sensor. This approach is, however, not suitable for many applications where enrollment and authentication should be carried out using the same electronic device, such as a mobile communication device.

It has therefore been proposed to require the user to place his/her finger on the small fingerprint sensor several times during enrolment and then combine data from several partial images to form the template. Depending on, for example, the variation in finger placement and the size of the fingerprint (the size of the finger), it may be difficult to determine if or when sufficient fingerprint data has been acquired based on a given number of finger placements. Alternatively, to ensure that sufficient fingerprint data is always acquired, the enrolment procedure may require a very large number of finger placements upon enrolment. This approach, however, would lead to a time-consuming enrolment procedure, which may result in the user deciding not to use the fingerprint-based authentication system at all.

In view of this, US2013/0259330 discloses a method and system for continuously updating and expanding an enrolled template using later acquired partial fingerprint images that match with the stored template.

However, there appears to still be room for improvement. In particular, it would be desirable to provide for a faster expansion of the enrolled template.

SUMMARY

In view of the above-mentioned and other drawbacks of the prior art, it is an object of the present invention to provide for improved fingerprint authentication, in particular to provide for a faster expansion of a stored template.

According to a first aspect of the present invention, it is therefore provided a method of authenticating a finger of a user against a stored template and expanding the stored template, comprising the steps of: acquiring a present partial candidate fingerprint image; retrieving a stored enrolment representation for the user, the stored enrolment representation comprising the stored template, and a stored representation of at least a first previous partial candidate fingerprint image acquired in connection with a previous failed authentication attempt for the user; determining if a first match between a representation of the present partial candidate fingerprint image and the stored template fulfills a first template updating requirement; determining if a second match between the representation of the present partial candidate fingerprint image and the stored representation of the at least first previous partial candidate fingerprint image fulfills a second template updating requirement; when it is determined that the first match fulfills the first template updating requirement and the second match fulfills the second template updating requirement: providing a signal indicating a successful authentication; and forming a first expanded template based on the stored template, the present candidate fingerprint image and the at least first previous candidate fingerprint image.

The stored template may be any representation of a fingerprint usable as a basis for authenticating a representation of a present partial candidate fingerprint image.

For example, the stored template may be a composite fingerprint template formed through assembly of partial fingerprint images or assembly of partial templates, each being based on an acquired partial fingerprint image.

Alternatively, the stored template may be formed by a plurality of partial templates, each being based on an acquired partial fingerprint image.

In the context of the present application, a "representation" of a fingerprint image may be any information extracted from the fingerprint image, which is useful for assessing the similarity between fingerprint images acquired at different times. For instance, the representation of the fingerprint image may comprise descriptions of fingerprint features (such as so-called minutiae) and information about the positional relationship between the fingerprint features. Alternatively, the representation of the fingerprint image may be the image itself, or a compressed version of the image. For example, the image may be binarized and/or skeletonized.

The above-mentioned first and second template updating requirements, which may be predefined and stored in memory, may be identical or mutually different.

The template updating requirements may, for example, be embodied in the form of threshold matching scores that may indicate a minimum similarity between fingerprint images required for template updating to take place.

In various embodiments, the template updating requirements may indicate at least a required number of corresponding fingerprint features. However, other properties may also be used, alone or in combination with a requirement on the number of corresponding fingerprint features. For instance, the positional relationship between the fingerprint features may be used.

The template update requirements may be the same or similar as the requirements for determining if an authentication attempt is successful. According to various embodiments, however, the template update requirements may be stricter than an authentication requirement.

It should be noted that a fingerprint authentication system may be comprised in a stand-alone electronic device, such as a mobile communication device, or may be formed by interconnected devices, such as a computer and a fingerprint acquisition device connected to the computer.

The fingerprint sensor may, for example, be a capacitive fingerprint sensor detecting a measure indicative of the capacitive coupling between each sensing element in an array of sensing elements and a finger surface touching the sensor surface. Sensing elements at locations corresponding to ridges in the fingerprint will exhibit a stronger capacitive coupling to the finger than sensing elements at locations corresponding to valleys in the fingerprint.

However, the various embodiments of the present invention are not limited to a particular fingerprint sensing technology, but are equally applicable to, for instance, optical, thermal or piezo-electric fingerprint sensors etc.

The steps of the methods according to various embodiments of the present invention need not necessarily be performed in any particular order. For instance, the above-mentioned second match can be evaluated before the above-mentioned first match and/or the signal indicating a successful authentication may be provided at any time after it has been determined that the first match fulfills the first template updating requirement.

The present invention is based upon the realization that a stored template can be expanded faster by saving representations of previous partial fingerprint images acquired in connection with failed authentications attempts, and expanding the stored template based on one or several such previous partial fingerprint images when a present partial fingerprint image is determined to be sufficiently similar to the fingerprint image represented by the stored template and also sufficiently similar to the one or several previous partial fingerprint images.

A faster expansion of the stored template provides for a faster improvement in the performance of the fingerprint authentication system and/or allows for a simpler and faster enrolment procedure, making the fingerprint authentication system according to embodiments of the present invention more user-friendly without compromising the performance.

According to various embodiments, it may be determined if the second match fulfills the second template updating requirement by comparing the stored representation of the at least first previous partial candidate fingerprint image and the representation of the present partial candidate fingerprint image.

In these embodiments, a limited and known number of matches between partial fingerprint images may be carried out in connection with a successful authentication, which provides for a fast and predictable authentication and template expansion procedure.

In other embodiments, the method according to the present invention may further comprise the step of forming, when it is determined that the first match fulfills the first predefined template updating requirement, an updated template based on the stored template and the present candidate fingerprint image, wherein it is determined if the second match fulfills the second template updating requirement by comparing the stored representation of the at least first previous partial candidate fingerprint image and the updated template.

These embodiments may provide for an even faster expansion of the stored template. Furthermore, the first and second template updating requirements may be identical or at least very similar, which may facilitate implementation of the fingerprint authentication method.

Further expansion of the stored template in connection with a successful authentication may be achieved by determining if a third match between a stored representation of a second previous partial candidate fingerprint image and the first expanded template fulfills a third template updating requirement; and when it is determined that the third match fulfills the third template updating requirement: forming a second expanded template based on the first expanded template and the second previous candidate fingerprint image.

The stored template can only be expanded when the first match (between the representation of the present partial fingerprint image and the stored template) fulfills the first template updating requirement. In this case, an updated template can be formed at least based on the stored template and the present partial candidate fingerprint image. If, on the other hand, the first match fails to fulfill the first template updating requirement, the representation of the present partial candidate fingerprint image may be added to the enrolment representation as a representation of a previous partial fingerprint image, thereby forming an updated enrolment representation.

It may be desirable to somehow qualify partial fingerprint images acquired in connection with failed authentication attempts, to make better use of the available memory space.

According to one embodiment, the method of the present invention may therefore further comprise the step of evaluating at least one image property of the present partial candidate fingerprint image in respect of an image property criterion, wherein the representation of the present partial candidate fingerprint image may only be added to the stored enrolment representation when the at least one image property fulfills the image property criterion.

Such an image property criterion may, for instance be indicative of a threshold image quality, to reduce the risk of including partial fingerprint images with poor image quality (blurry images, images with insufficient contrast, images with saturated portions etc.) in the enrolment representation for the user.

Alternatively, or in combination, the image property criterion may be indicative of a likelihood that the present partial candidate fingerprint image is an image of a finger of the user.

For instance, different users may have fingerprints exhibiting distinctly different general characteristics, such as average distance between adjacent fingerprint ridges etc.

According to various embodiments, the method of the present invention may additionally provide for a procedure for removing representations of previous partial candidate fingerprint images from the memory of the fingerprint authentication system based on an evaluation of at least one property of each of the stored previous partial candidate fingerprint images. The at least one property may be selected from a group comprising image quality, image age, similarity to other previous partial candidate fingerprint images etc.

According to a second aspect of the present invention, there is provided a fingerprint authentication system for authenticating a user, comprising: a fingerprint sensor; a memory; and processing circuitry connected to the fingerprint sensor, and to the memory for: controlling the fingerprint sensor to acquire a present partial candidate fingerprint image of a candidate fingerprint to be authenticated; retrieving, from the memory, at least one stored enrolment representation for the user, the at least one stored enrolment representation comprising the stored template, and a stored representation of at least a first previous partial candidate fingerprint image acquired in connected with a previous failed authentication attempt for the user; determining if a first match between a representation of the present partial candidate fingerprint image and the stored template fulfills a first template updating requirement; determining if a second match between the representation of the present partial candidate fingerprint image and the stored representation of the at least first previous partial candidate fingerprint image fulfills a second template updating requirement; when it is determined that the first match fulfills the first template updating requirement and the second match fulfills the second template updating requirement: providing a signal indicating a successful authentication; and forming a first expanded template based on the stored template, the present candidate fingerprint image and the at least first previous candidate fingerprint image.

The processing circuitry may be provided in the form of one or several processors, which may also control other functions of the electronic device in which the fingerprint authentication system may be comprised.

Further embodiments of, and effects obtained through this second aspect of the present invention are largely analogous to those described above for the first aspect of the invention.

In summary, the present invention relates to a method of authenticating a finger against a stored template and expanding the stored template. The method comprises acquiring a present fingerprint image; retrieving a stored enrolment representation, comprising said stored template, and a representation of at least a first previous fingerprint image acquired in connection with a previous failed authentication attempt; and determining if the stored template should be expanded. When it is determined that a first match between a present fingerprint image representation and the stored template fulfills a first template updating requirement and a second match between the present fingerprint image representation and said at least first previous fingerprint image representation fulfills said second template updating requirement, a signal indicating a successful authentication is provided; and a first expanded template is formed based on said stored template, said present fingerprint image and said at least first previous fingerprint image.

BRIEF DESCRIPTION OF THE DRAWINGS

These and other aspects of the present invention will now be described in more detail, with reference to the appended drawings showing an example embodiment of the invention, wherein:

FIGS. 7a-c schematically illustrates an example of an enrolment representation and the present partial candidate fingerprint image in relation to the user's fingerprint at different stages of the method in FIG. 6.

DETAILED DESCRIPTION OF EXAMPLE EMBODIMENTS

In the present detailed description, various embodiments of the method and electronic device according to the present invention are mainly described with reference to a substantially square fingerprint sensor arranged adjacent to the touch display of a mobile phone.

It should be noted that this by no means limits the scope of the present invention, which equally well includes, for example, other electronic devices such as tablets, computers or watches. Furthermore, the fingerprint sensor may have any other shape. For instance, the fingerprint sensor may be provided as an elongated rectangle.

Figures 1A, 1B, 1C:
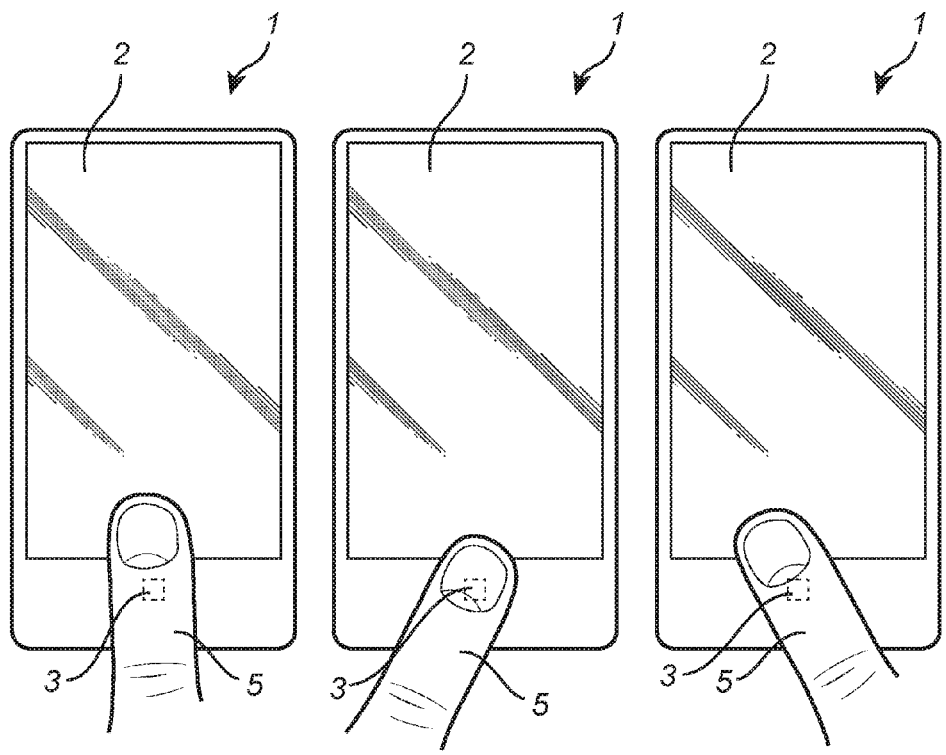
FIGS. 1a-c schematically show three different exemplary authentication attempts using a small fingerprint sensor.

For the purpose of providing an introduction to the challenges involved in using a small fingerprint sensor, FIGS. 1a-c schematically show three different exemplary authentication attempts using a small fingerprint sensor.

Referring first to FIG. 1a, an electronic device, here in the form of mobile phone 1, comprises a touch display 2 and a fingerprint sensor 3. The touch display 2 comprises a touch sensor for touch-based control of the mobile phone 1 and a display acting as a user interface.

In FIG. 1a, the user of the mobile phone 1 makes a first authentication attempt by placing his finger 5 on the fingerprint sensor 3.

FIG. 1b and FIG. 1c illustrate second and third authentication attempts in which the user places his finger 5 on the fingerprint sensor 3.

As is indicated in FIGS. 1a-c, a user will typically not place his finger in exactly the same way on the fingerprint sensor 3 in connection with different authentication attempts. However, the user will expect the authentication attempts to succeed in at least all of the cases shown in FIGS. 1a-c to be motivated to continue to use fingerprint authentication.

Figure 2:
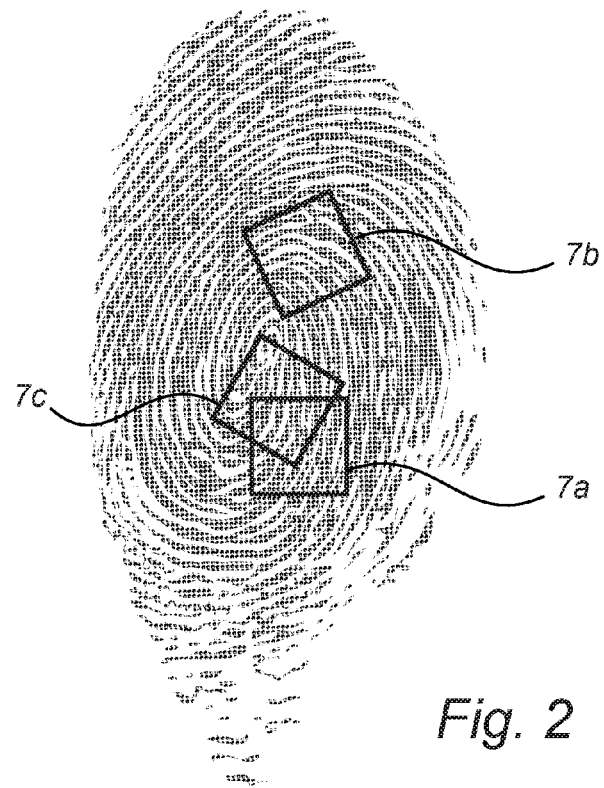
FIG. 2 schematically illustrates the partial fingerprint images acquired in FIGS. 1a-c in relation to the user's fingerprint.

In FIG. 2, the different portions of the user's fingerprint imaged in the different partial fingerprint images acquired in connection with the authentication attempts in FIGS. 1a-c are indicated on an illustration of the total fingerprint of the finger 5. In FIG. 2, the first fingerprint portion 7a corresponds to the authentication attempt in FIG. 1a, while the second 7b and third 7c fingerprint portions correspond to FIGS. 1b and 1c, respectively.

Considering the illustration in FIG. 2, it is easy to understand that, for all of the authentication attempts in FIGS. 1a-c to be successful, the stored fingerprint template used for authentication based on the partial fingerprint images should correspond to a considerably larger portion of the user's fingerprint than each of the fingerprint portions 7a-c imaged by the partial fingerprint images. It is also easy to understand that an enrolment procedure resulting in a template covering a sufficiently large portion of the user's fingerprint may require a large number of finger placements.

Having now briefly explained the need for a fingerprint template corresponding to a relatively large portion of the user's fingerprint, various embodiments of the present invention providing for such a fingerprint template will be described in the following.

Figure 3:
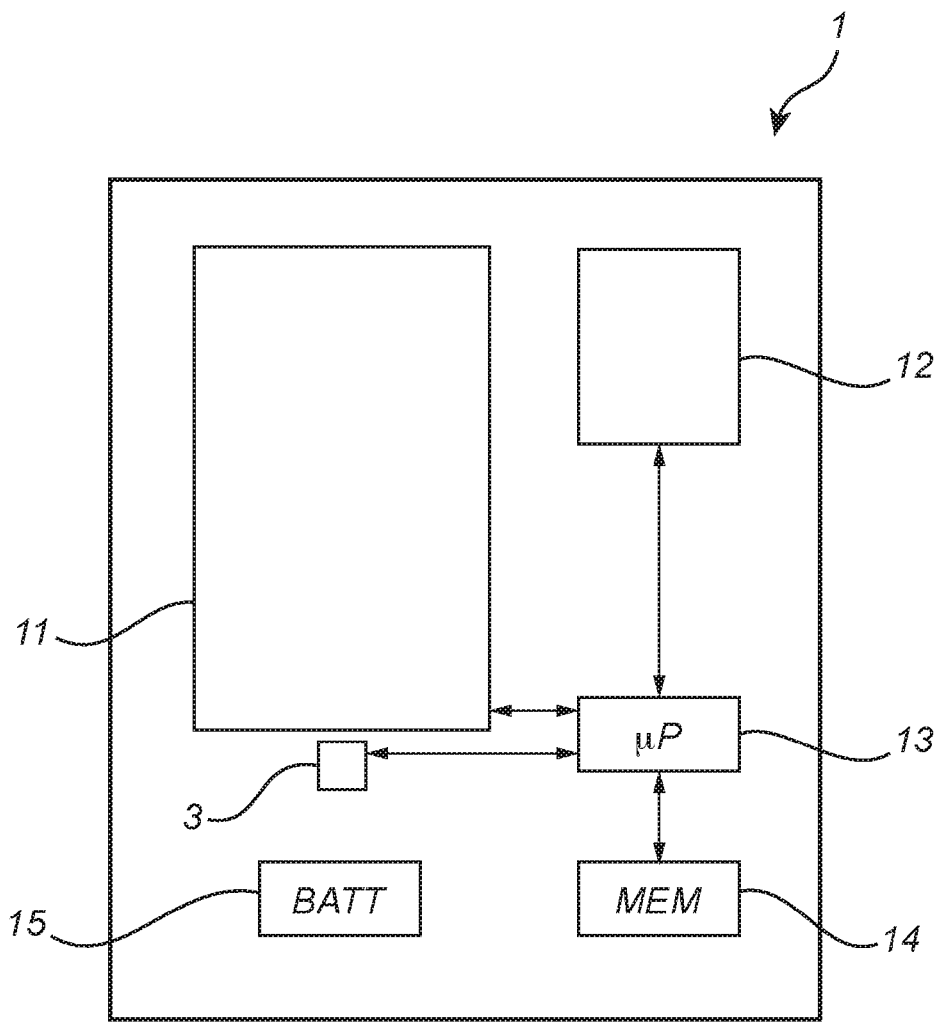
FIG. 3 is a block diagram of an example embodiment of the fingerprint authentication system according to the present invention.

Referring to the block diagram in FIG. 3, the electronic device (mobile phone) 1 in FIG. 1 comprises, in addition to the fingerprint sensor 3, a touch sensor 11, a display 12, processing circuitry here in the form of microprocessor 13, a memory 14 and a battery 15 for providing electrical energy to the various components of the electronic device 1. Although the processing circuitry is schematically indicated in FIG. 3 as a single microprocessor, it should be noted that this is a simplified illustration, and that the processing circuitry may comprise several processors. For instance, the processing circuitry may comprise a fingerprint processor dedicated for acquisition and processing of fingerprint images, template generation and/or authentication. Moreover, the processing circuitry may comprise a display driver for control of the display 12 etc.

Figure 4:
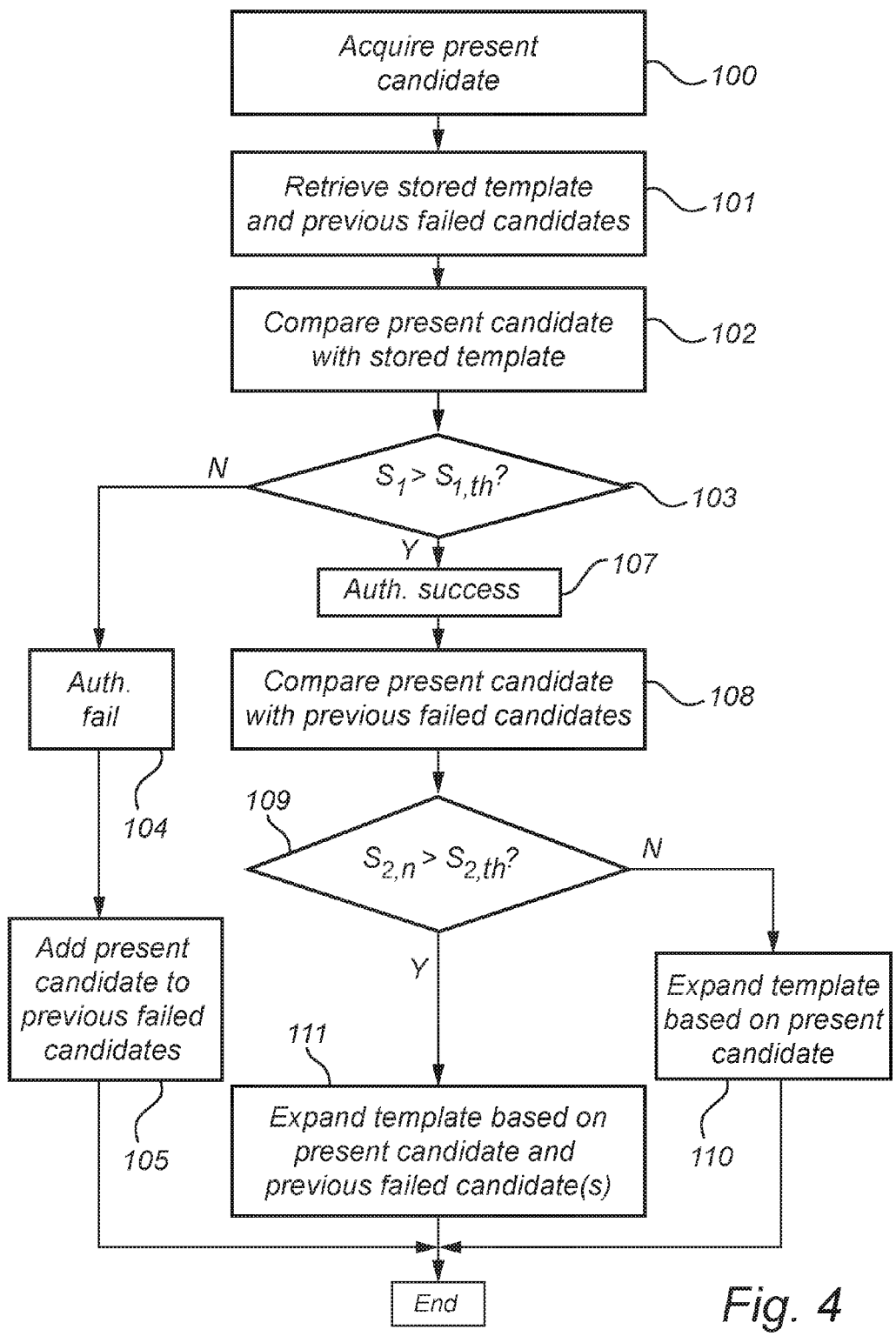
FIG. 4 is a flow-chart schematically illustrating a method according to a first embodiment of the present invention.
Figure 5B:
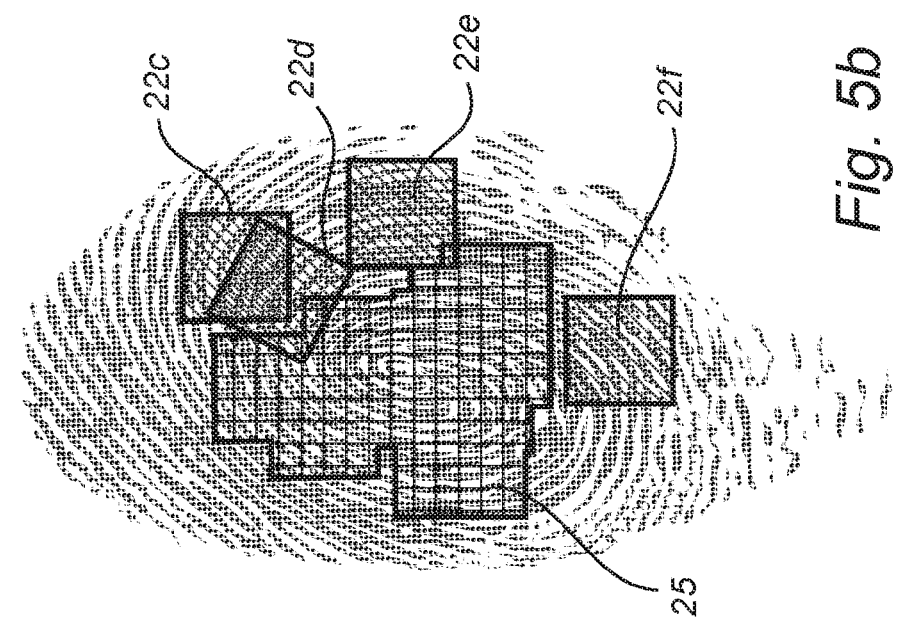
FIG. 5a-b schematically illustrates an example of an enrolment representation and the present partial candidate fingerprint image in relation to the user's fingerprint at different stages of the method in FIG. 4.

A first exemplary embodiment of the method according to the present invention will now be described with reference to the flow-chart in FIG. 4 together with the illustrations in FIG. 3, and FIGS. 5a-b.

In a first step 100, in response to an authentication request, the fingerprint sensor 3 is controlled by the processing circuitry 13 to acquire a present partial candidate fingerprint image. The acquired present partial candidate fingerprint image 20 is represented by the unfilled square in FIG. 5a.

In the subsequent step 101, a stored enrolment representation for the user is retrieved by the processor 13 from the memory 14. As is schematically indicated in FIG. 5a, the stored enrolment representation comprises a stored template 21 (indicated as an area with a squared pattern in FIG. 5a), and a plurality of previous partial candidate fingerprint images 22a-f (indicated as hatched squares in FIG. 5a).

Figure 5A:
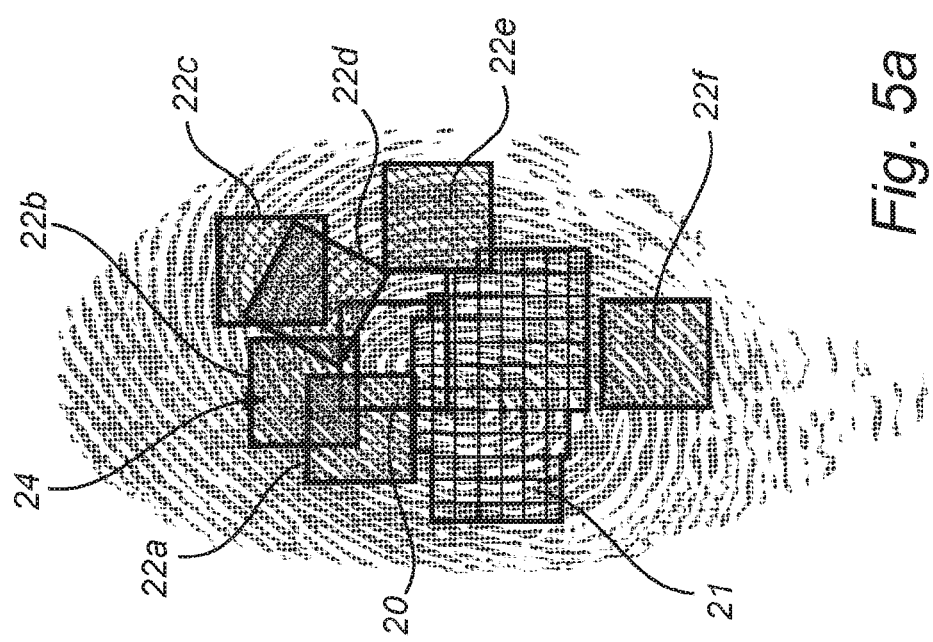

In this context it should be noted that the illustration of the enrolment representation in FIG. 5a is only intended to indicate an exemplary coverage of the enrolment representation in relation to the user's fingerprint. The stored template 21 and/or the previous partial candidate fingerprint images 22a-f may be stored in any suitable form, for instance as a table of fingerprint feature descriptors and their respective absolute or relative positions.

In the next step 102, a representation of the present partial candidate fingerprint image 20 is compared with the stored template 21 to evaluate a first match between the present partial candidate fingerprint image 20 and the stored template 21. For instance, the first match can be evaluated by comparing fingerprint features extracted from the present partial candidate fingerprint image 20 with fingerprint features of the stored template 21. Based on the comparison between the representation of the present partial candidate fingerprint image 20 and the stored template 21, a first match score $S_1$ can be determined.

This first match score $S_1$ is evaluated in relation to a first template updating requirement, here a first threshold match score $S_{1,th}$ in step 103.

When it is determined in step 103 that the first match score $S_1$ does not exceed the first threshold match score $S_{1,th}$, the method proceeds to step 104 and the processor 13 provides a signal indicating a failed authentication. The signal provided by the processor 13 may be used to indicate to the user, for example via the display 12, that the authentication attempt failed. In step 105, the present partial candidate fingerprint image 20 is stored in the memory 14 and added to the enrolment representation as a previous partial candidate fingerprint image. In connection with this, the present partial candidate fingerprint image 20 may be matched with the already stored previous partial candidate fingerprint images 22a-f to determine if one or several cluster(s) can be formed including the present partial candidate fingerprint image 20. It should be noted the match between a cluster including the partial candidate fingerprint image 20 and the stored template 21 may fulfill the requirements for updating the stored template 21. The method may therefore optionally further include evaluating a match between newly formed clusters and the stored template 21.

When, on the other hand, it is determined in step 103 that the first match fulfills the first template updating requirement, the method proceeds to step 107 and the processor 13 provides a signal indicating authentication success. The signal provided by the processor 13 may be used to indicate to the user, for example via the display 12, that the authentication attempt succeeded.

In the next step 108, the above-mentioned representation of the present partial candidate fingerprint image 20 is compared with a representation of at least a first of the stored previous partial candidate fingerprint images 22a-f to evaluate a second match between the present partial candidate fingerprint image 20 and the at least first previous partial candidate fingerprint image 22a-f. For example, the representation of the present partial candidate fingerprint image 20 may be successively compared with each of the stored previous partial candidate fingerprint images 22a-f, and for each comparison, a match score $S_{2,n}$ may be determined.

This second match score $S_{2,n}$ for each of the above-mentioned comparisons is evaluated in relation to a second template updating requirement, here a second threshold match score $S_{2,th}$ in step 109.

When it is determined in step 109 that the none of the comparisons between the representation of the present partial candidate fingerprint image 20 and each representation of the previous partial candidate fingerprint images 22a-f results in a second match score $S_{2,n}$ that exceeds the second threshold match score $S_{2,th}$, the method proceeds to step 110.

In step 110, an expanded template is formed by the processor 13 based on the stored template and the present partial candidate fingerprint image 20, and the expanded template is stored in the memory 14.

When it is instead determined in step 109 that the one or several of the comparisons between the representation of the present partial candidate fingerprint image 20 and each representation of the previous partial candidate fingerprint images 22a-f results in a second match score $S_{2,n}$ that exceeds the second threshold match score $S_{2,th}$, the method proceeds to step 111.

In step 111, an expanded template is formed by the processor 13 based on the stored template, the present partial candidate fingerprint image 20, and the previous partial candidate fingerprint image(s) for which the second match score $S_{2,n}$ exceeds the second threshold match score $S_{2,th}$, and the expanded template is stored in the memory 14.

In the example illustrated in FIG. 5a, the only one of the previous partial candidate fingerprint images 22a-f that matches sufficiently well with the present partial candidate fingerprint image 20 is the previous partial candidate fingerprint image 22a with the largest overlap. However, the two mutually overlapping previous partial candidate fingerprint images 22a and 22b have previously been matched with each other and form a cluster 24. The expanded template, which is indicated as 25 in FIG. 5b is thus formed based on the present partial candidate fingerprint image 20, the stored template 21, and the above-mentioned cluster 24 of previous partial candidate fingerprint images.

Figure 6:
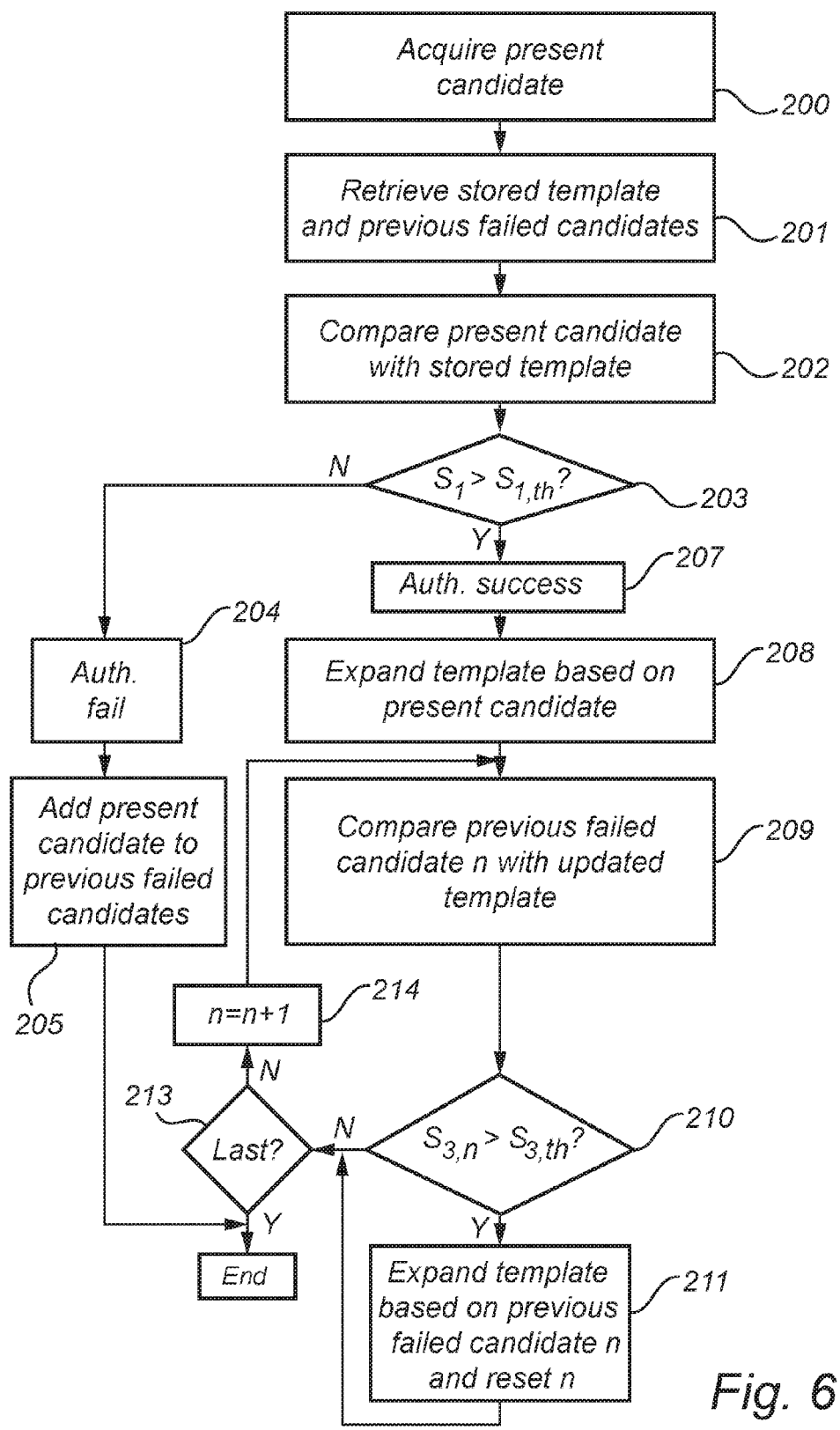
FIG. 6 is a flow-chart schematically illustrating a method according to a second embodiment of the present invention.

A second exemplary embodiment of the method according to the present invention will now be described with reference to the flow-chart in FIG. 6 together with the illustrations in FIG. 3, and FIGS. 7a-c.

In a first step 200, in response to an authentication request, the fingerprint sensor 3 is controlled by the processing circuitry 13 to acquire a present partial candidate fingerprint image. The acquired present partial candidate fingerprint image 20 is represented by the unfilled square in FIG. 7a.

In the subsequent step 201, a stored enrolment representation for the user is retrieved by the processor 13 from the memory 14. As is schematically indicated in FIG. 7a, the stored enrolment representation comprises a stored template 21 (indicated as an area with a squared pattern in FIG. 7a), and a plurality of previous partial candidate fingerprint images 22a-f (indicated as hatched squares in FIG. 7a).

In the next step 202, a representation of the present partial candidate fingerprint image 20 is compared with the stored template 21 to evaluate a first match between the present partial candidate fingerprint image 20 and the stored template. Based on the comparison between the representation of the present partial candidate fingerprint image 20 and the stored template 21, a first match score $S_1$ can be determined.

This first match score $S_1$ is evaluated in relation to a first template updating requirement, here a first threshold match score $S_{1,th}$ in step 203.

When it is determined in step 203 that the first match score $S_1$ does not exceed the first threshold match score $S_{1,th}$, the method proceeds to step 204 and the processor 13 provides a signal indicating a failed authentication. The signal provided by the processor 13 may be used to indicate to the user, for example via the display 12, that the authentication attempt failed. In step 205, the present partial candidate fingerprint image 20 is stored in the memory 14 and added to the enrolment representation as a previous failed partial candidate fingerprint image. In connection with this, the present partial candidate fingerprint image 20 may be matched with the already stored previous partial candidate fingerprint images 22a-f to determine if one or several cluster(s) can be formed including the present partial candidate fingerprint image 20. It should be noted the match between a cluster including the partial candidate fingerprint image 20 and the stored template 21 may fulfill the requirements for updating the stored template 21. The method may therefore optionally further include evaluating a match between newly formed clusters and the stored template 21.

When, on the other hand, it is determined in step 203 that the first match fulfills the first template updating requirement, the method proceeds to step 207 and the processor 13 provides a signal indicating authentication success. The signal provided by the processor 13 may be used to indicate to the user, for example via the display 12, that the authentication attempt succeeded.

In the next step 208, an updated template is formed by the processor 13 based on the stored template 21 and the present partial candidate fingerprint image 20, and the updated template is stored in the memory 14. The updated template is indicated by reference numeral 28 in FIG. 7b.

Subsequently, in step 209, a representation of the $n^{th}$ previous partial candidate fingerprint image, for example starting with the first previous partial candidate fingerprint image 22a, is compared with the updated template 28. As described above, the comparison may result in a third match score $S_{3,n}$.

This third match score $S_{3,n}$ is evaluated in relation to a third template updating requirement, here a third threshold match score $S_{3,th}$ in step 210.

When it is determined in step 210 that the third match score $S_{3,n}$ for a comparison between the updated template 28 and the $n^{th}$ previous partial candidate fingerprint image exceeds the third threshold match score $S_{3,th}$, the method proceeds to step 211, in which the processor 13 forms a new updated template based on the currently stored updated template and the $n^{th}$ previous partial candidate fingerprint image, and the counter n is reset. Since the counter n is reset, it will not matter in which order the previous partial candidate fingerprint images are evaluated.

In the presently illustrated example, the first previous partial candidate fingerprint image 22a matches sufficiently well with the updated stored template 28 to fulfill the template update requirement, and the stored template is therefore expanded based on the stored template (updated template 28) and the first previous partial candidate fingerprint image 22a. The resulting new updated template is indicated by reference numeral 30 in FIG. 7c.

Following step 211, the method proceeds to step 213. Since the counter n was reset in step 211, the method will directly proceed to step 214 where the counter is incremented before the method returns to step 209. If the evaluated previous partial candidate fingerprint image is the last, the method terminates.

Returning to step 210, when it is determined that the match score $S_{3,n}$ does not exceed the threshold match score $S_{3,th}$, the method goes to step 213 and proceeds as described above.

In the present example, the stored template 21 will be expanded five times in succession before the method terminates. First, the stored template will be expanded with the present partial candidate fingerprint image 20, and then with the first 22a, second 22b, fourth 22d, and third 22c previous partial candidate fingerprint images in succession. Only the first iterations are shown in FIGS. 7a-c.

Regarding the fourth previous partial candidate fingerprint image 22d, it should be noted that the successive template enlargement of this second embodiment of the invention allows addition of the fourth 22d (and the third 22c) previous partial candidate fingerprint image even though neither the match between the present partial candidate fingerprint image 20 and the fourth previous partial candidate fingerprint image 22d, nor the match between the second previous partial candidate fingerprint image 22b and the fourth partial candidate fingerprint image 22d fulfills the matching requirement on its own. After expanding the template with the second previous partial candidate fingerprint image 22b (in the step following the situation shown in FIG. 7c), the match between the template and the fourth previous partial candidate fingerprint image 22d will, however, fulfill the matching requirement for template expansion. This provides for a very efficient and fast template expansion.

Alternatively, the stored template 21 may be expanded three times in succession, first with the present partial candidate fingerprint image 20, then with a cluster comprising the first 22a and second 22b previous partial candidate fingerprint images, and thereafter with a cluster comprising the third 22c and fourth 22d previous partial candidate fingerprint images as described above in connection with the flow-chart in FIG. 4.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of authenticating a finger of a user against a stored template and expanding the stored template, comprising the steps of:
   acquiring a present partial candidate fingerprint image;
   retrieving a stored enrolment representation for said user, the stored enrolment representation comprising said stored template, and a stored representation of at least a first previous partial candidate fingerprint image acquired in connection with a previous failed authentication attempt for said user;
   determining if a first match between a representation of the present partial candidate fingerprint image and said stored template fulfills a first template updating requirement;
   determining if a second match between said representation of the present partial candidate fingerprint image and said stored representation of the at least first previous partial candidate fingerprint image fulfills a second template updating requirement;
   when it is determined that said first match fulfills said first template updating requirement and said second match fulfills said second template updating requirement:
   providing a signal indicating a successful authentication; and
   forming a first expanded template based on said stored template, said present partial candidate fingerprint image and said at least first previous partial candidate fingerprint image.

2. The method according to claim 1, wherein it is determined if said second match fulfills said second template updating requirement by comparing said stored representation of the at least first previous partial candidate fingerprint image and said representation of the present partial candidate fingerprint image.

3. The method according to claim 1, further comprising the step of:
   when it is determined that said first match fulfills said first predefined template updating requirement:
   forming an updated template based on said stored template and said present candidate fingerprint image,
   wherein it is determined if said second match fulfills said second template updating requirement by comparing said stored representation of the at least first previous partial candidate fingerprint image and said updated template.

4. The method according to claim 3, further comprising the steps of:
   determining if a third match between a stored representation of a second previous partial candidate fingerprint image and said first expanded template fulfills a third template updating requirement; and
   when it is determined that said third match fulfills said third template updating requirement:
   forming a second expanded template based on said first expanded template and said second previous partial candidate fingerprint image.

5. The method according to claim 1, further comprising the steps of:
   when it is determined that said first match fails to fulfill said first template updating requirement:
   forming an updated enrolment representation by adding said representation of the present partial candidate fingerprint image to said stored enrolment representation.

6. The method according to claim 5, further comprising the step of:
   evaluating at least one image property of said present partial candidate fingerprint image in respect of an image property criterion,
   wherein said representation of the present partial candidate fingerprint image is only added to said stored enrolment representation when said at least one image property fulfills said image property criterion.

7. The method according to claim 6, wherein said image property criterion is indicative of a threshold image quality.

8. The method according to claim 6, wherein said image property criterion is indicative of a likelihood that said present partial candidate fingerprint image is an image of a finger of said user.

9. The method according to claim 8, wherein said image property criterion is indicative of a threshold spatial frequency of fingerprint ridges or valleys.

10. The method according to claim 1, wherein said stored enrolment representation comprises a stored representation of a plurality of previous partial candidate fingerprint images, each having been acquired in connection with a corresponding previous failed authentication attempt for said user, said method further comprising the steps of:
    evaluating at least one property of each previous partial candidate fingerprint image in said plurality of previous partial candidate fingerprint images; and
    removing at least one of said previous partial candidate fingerprint images from said stored enrolment representation based on said evaluation.

11. A fingerprint authentication system for authenticating a user, comprising:
    a fingerprint sensor;
    a memory; and
    processing circuitry connected to said fingerprint sensor, and to said memory for:
    controlling said fingerprint sensor to acquire a present partial candidate fingerprint image of a candidate fingerprint to be authenticated;
    retrieving, from said memory, at least one stored enrolment representation for said user, the at least one stored enrolment representation comprising a stored template, and a stored representation of at least a first previous partial candidate fingerprint image acquired in connected with a previous failed authentication attempt for said user;
    determining if a first match between a representation of the present partial candidate fingerprint image and said stored template fulfills a first template updating requirement;

determining if a second match between said representation of the present partial candidate fingerprint image and said stored representation of the at least first previous partial candidate fingerprint image fulfills a second template updating requirement;

when it is determined that said first match fulfills said first template updating requirement and said second match fulfills said second template updating requirement:

providing a signal indicating a successful authentication; and forming a first expanded template based on said stored template, said present candidate fingerprint image and said at least first previous candidate fingerprint image.

12. The fingerprint authentication system according to claim 11, wherein said processing circuitry is configured to determine if said second match fulfills said second template updating requirement by comparing said stored representation of the at least first previous partial candidate fingerprint image and said representation of the present partial candidate fingerprint image.

13. The fingerprint authentication system according to claim 11, wherein said processing circuitry is configured to, when it is determined that said first match fulfills said first predefined template updating requirement:

form an updated template based on said stored template and said present candidate fingerprint image; and determine if said second match fulfills said second template updating requirement by comparing said stored representation of the at least first previous partial candidate fingerprint image and said updated template.

14. An electronic device comprising;

a fingerprint authentication system according to claim 11; and a processing unit configured to control said fingerprint authentication system to carry out a fingerprint authentication of a user, and to perform at least one user-requested process only if said user is verified using said fingerprint authentication system.

* * * * *